United States Patent [19]

Adams

[11] Patent Number: 5,360,231
[45] Date of Patent: Nov. 1, 1994

[54] ROTATABLE OCCUPANT RESTRAINT

[75] Inventor: Bryan Adin Adams, Tyrone, Ga.

[73] Assignee: Milliken Research Corporation, Spartanburg, S.C.

[21] Appl. No.: 100,935

[22] Filed: Aug. 2, 1993

[51] Int. Cl.$^5$ .................................. B60R 21/20
[52] U.S. Cl. ........................ 280/728A; 280/728 R; 280/728 B; 280/732
[58] Field of Search ........... 280/728 R, 728 A, 728 B, 280/730 R, 732

[56] References Cited

U.S. PATENT DOCUMENTS

| | | | |
|---|---|---|---|
| 3,580,603 | 5/1971 | Chute et al. | 280/150 |
| 3,618,979 | 11/1971 | Gulette | 280/150 AB |
| 3,752,501 | 8/1973 | Daniel et al. | 280/150 AB |
| 3,784,223 | 1/1974 | Hass et al. | 280/751 |
| 3,792,873 | 2/1974 | Buchner et al. | 280/150 |
| 4,832,300 | 6/1989 | Ziomek et al. | 280/732 |
| 4,948,168 | 8/1990 | Adomeit et al. | 280/732 |
| 5,018,761 | 5/1991 | Henseler | 280/730 |
| 5,062,664 | 11/1991 | Bishop et al. | 280/743 |
| 5,066,037 | 11/1991 | Castigno et al. | 280/732 |
| 5,074,583 | 12/1991 | Fujita et al. | 280/732 |
| 5,085,465 | 2/1992 | Hieahim | 280/738 |
| 5,087,071 | 2/1992 | Wallner et al. | 280/743 |
| 5,090,729 | 2/1992 | Watanabe | 280/743 |
| 5,096,222 | 3/1992 | Komerska et al. | 280/732 |
| 5,125,472 | 6/1992 | Hara | 280/732 |
| 5,149,127 | 9/1992 | Manabe et al. | 280/731 |
| 5,174,601 | 12/1992 | Frantz et al. | 280/740 |
| 5,306,042 | 4/1994 | Frank | 280/728 B |

*Primary Examiner*—Eric D. Culbreth
*Attorney, Agent, or Firm*—Terry T. Moyer; James M. Robertson

[57] ABSTRACT

An occupant restraint assembly for use in a vehicle conveying at least one passenger is provided. The occupant restraint assembly comprises an inflator for generating gas, a bag for receiving and containing the gas generated by the inflator and an enclosure for housing the inflator and the bag. The enclosure is rotatably mountable within a support structure such as the dash panel opposing the passenger, such that during inflation of the bag the enclosure rotates into an activated position for direct deployment of the bag between the support structure and the passenger.

5 Claims, 4 Drawing Sheets

U.S. Patent  Nov. 1, 1994  Sheet 1 of 4  5,360,231
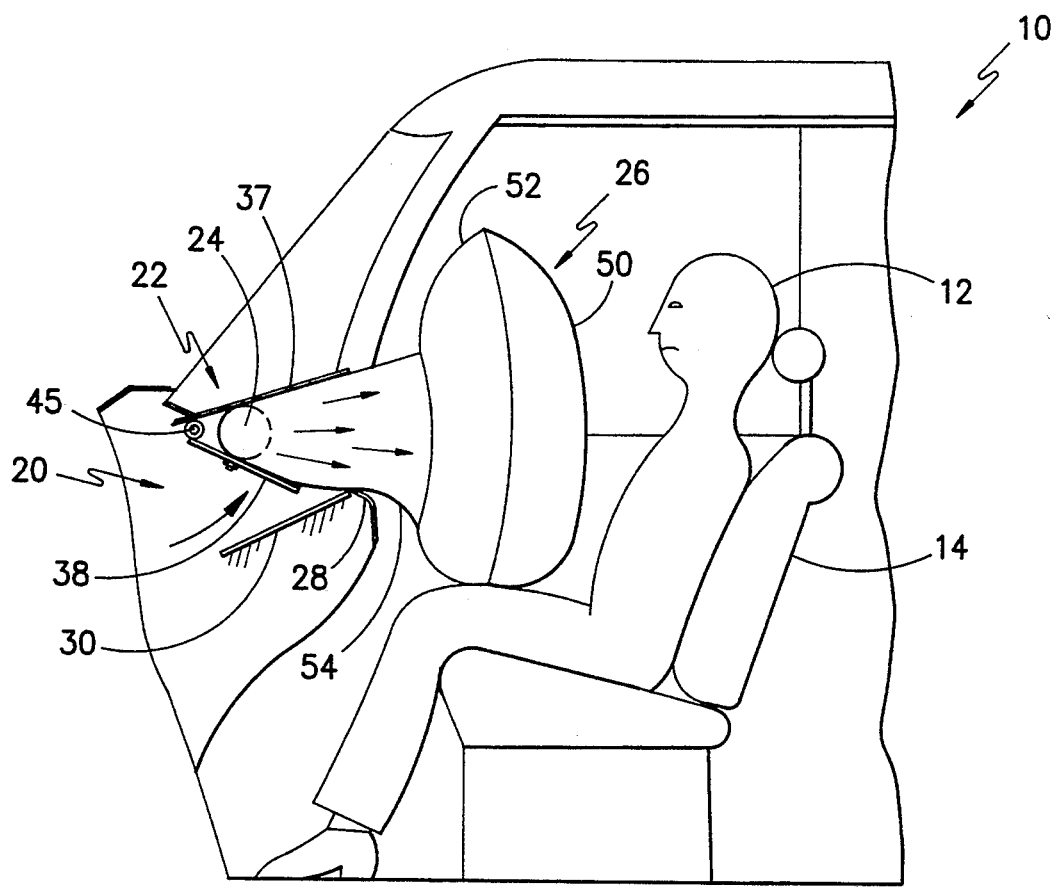
FIG. -1-
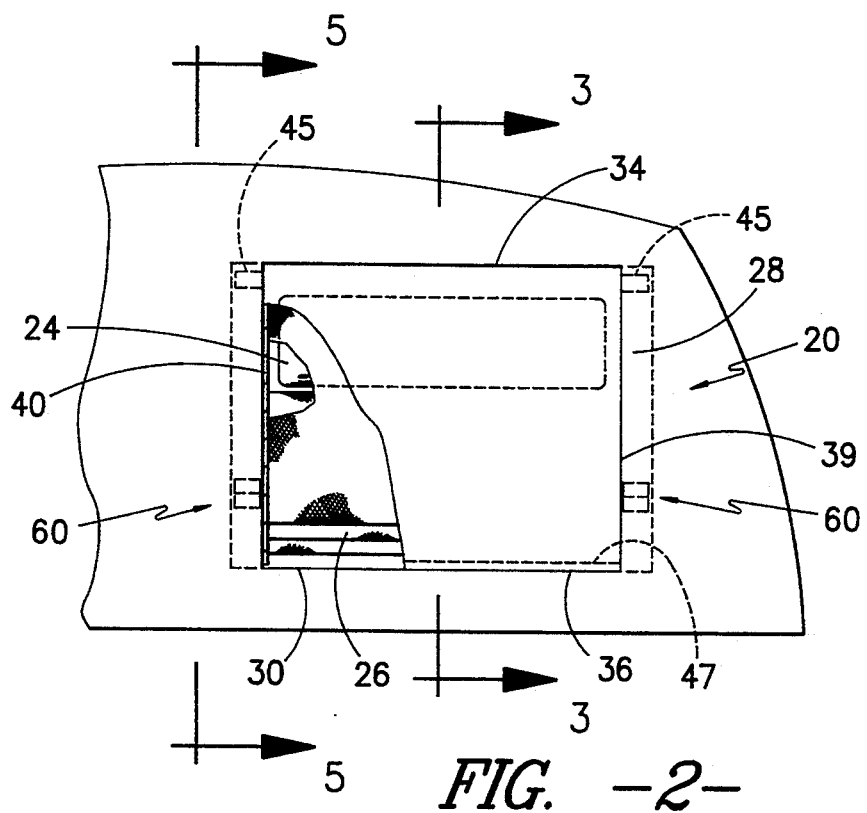
FIG. -2-

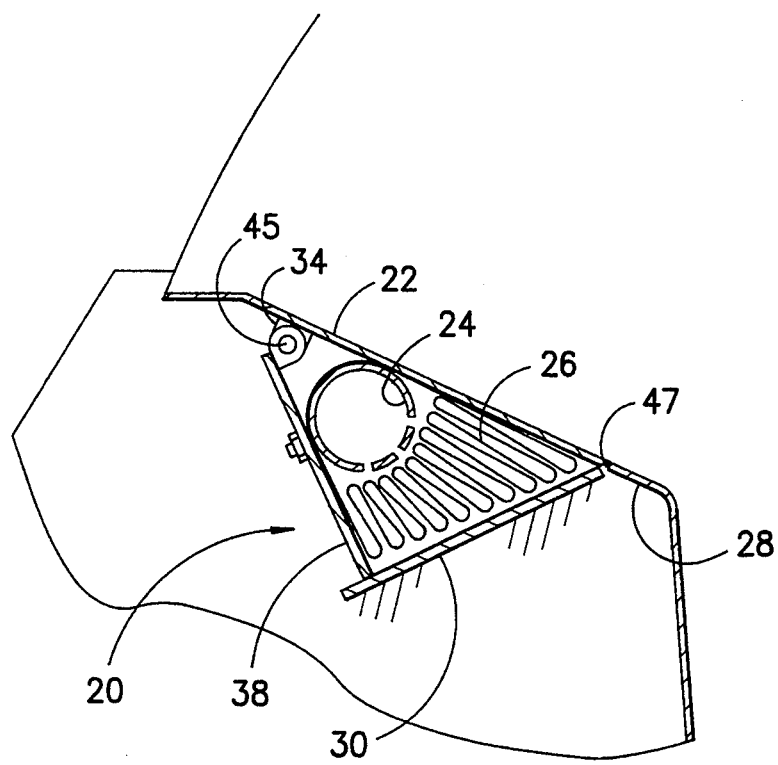
FIG. -3-
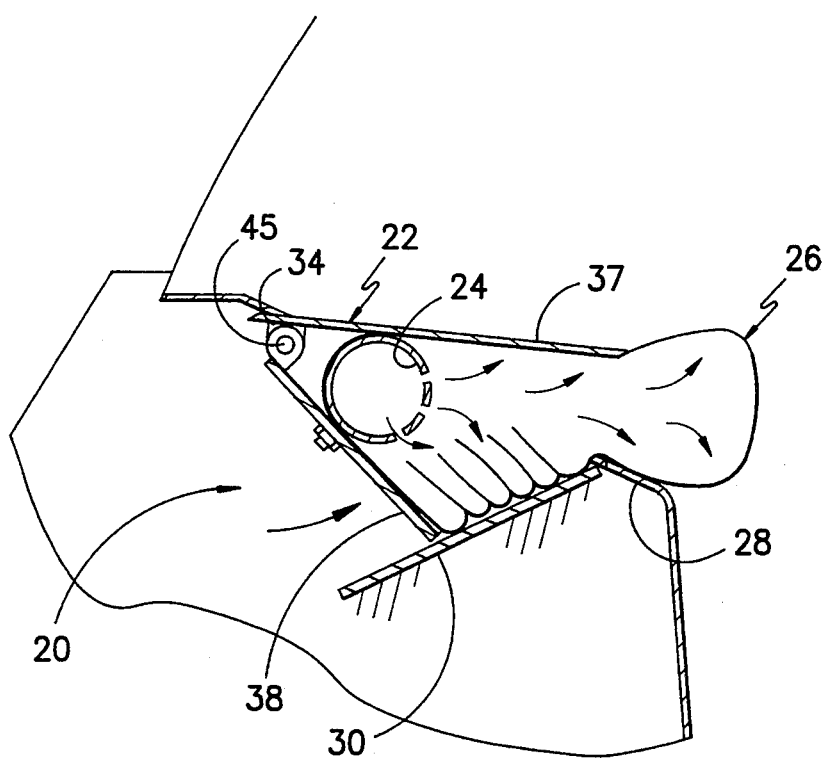
FIG. -4-

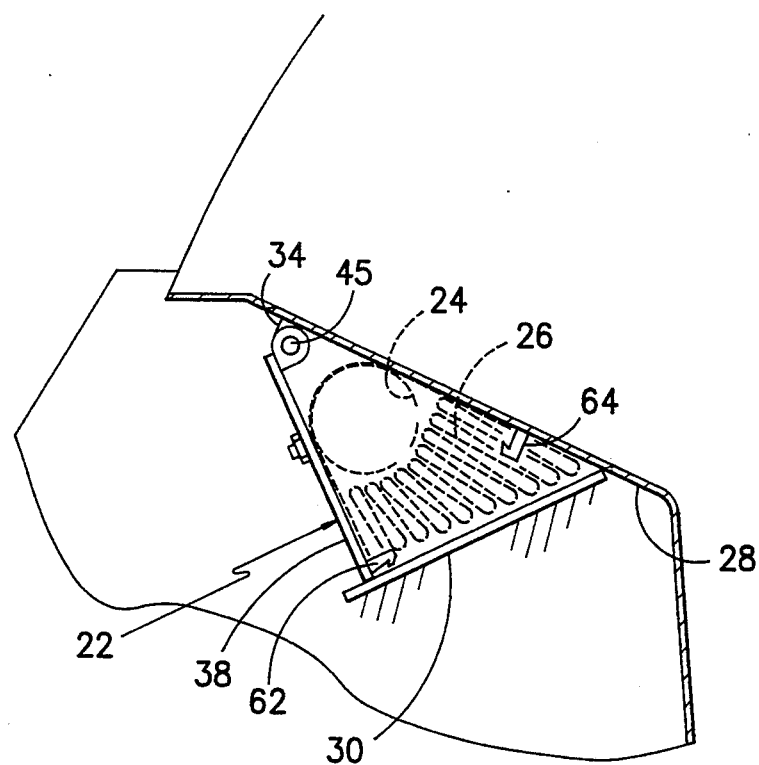
FIG. —5—
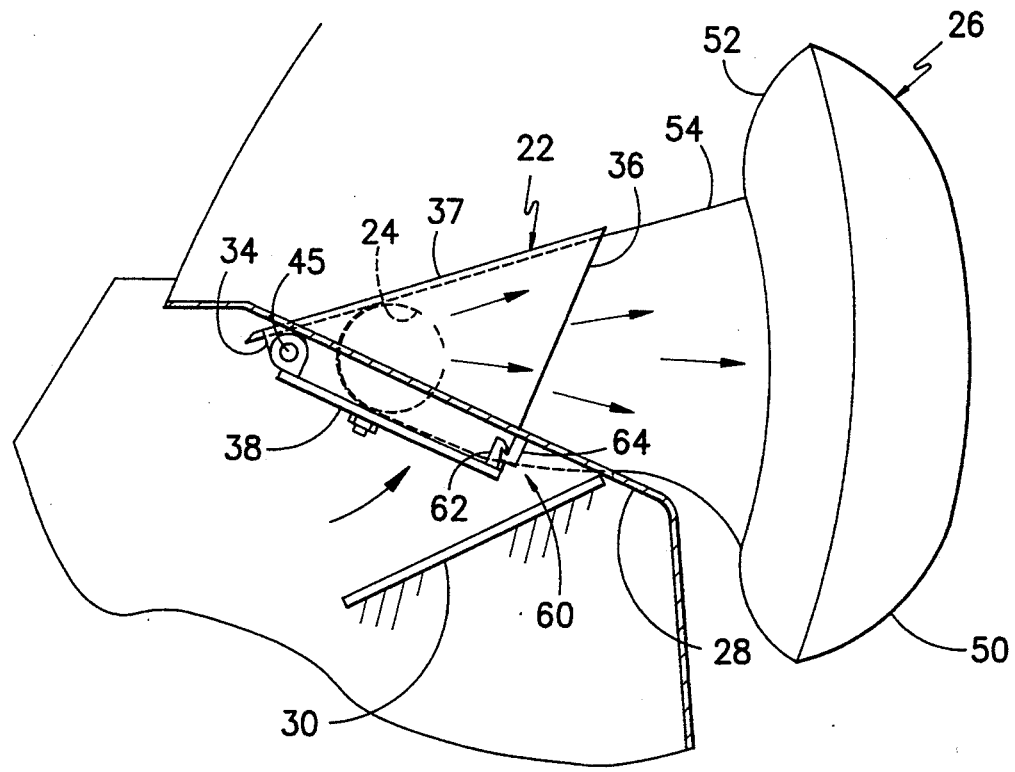
FIG. —6—

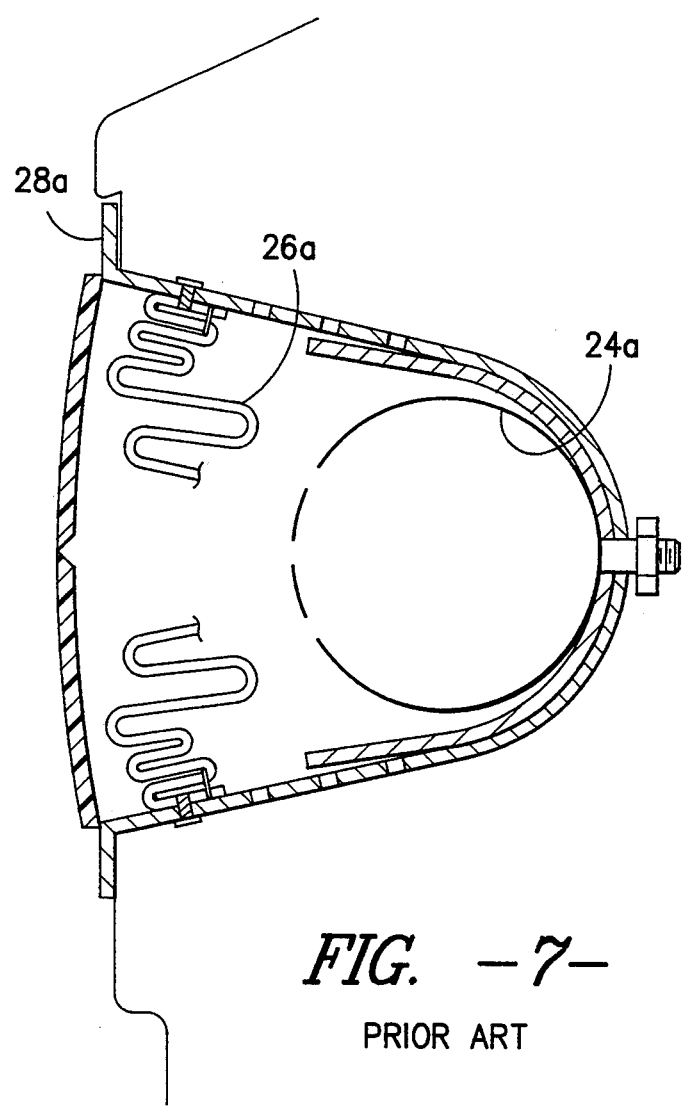
FIG. -7-
PRIOR ART
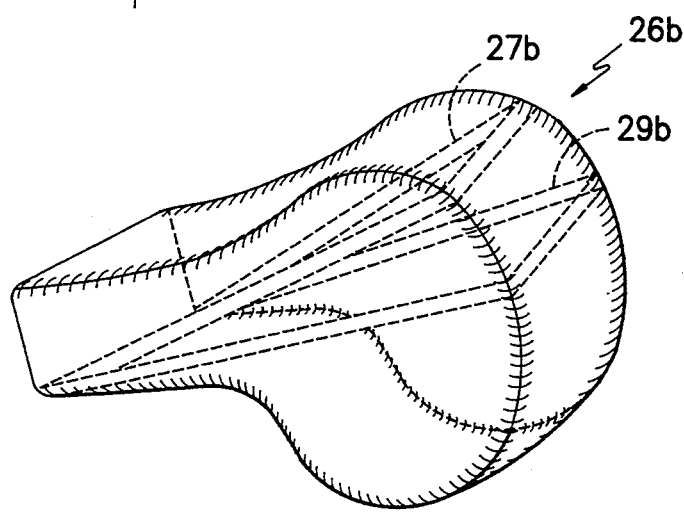
FIG. -8-
PRIOR ART

ROTATABLE OCCUPANT RESTRAINT

FIELD OF THE INVENTION

The present invention relates generally to vehicle occupant restraint systems and more particularly to a rotatable assembly for an inflatable bag which may be disposed in a supporting structure opposing a vehicle passenger and in particular disposed in the dash panel of the vehicle such that the air bag may be outwardly deployed towards the passenger from a non-vertical portion of the dash panel.

BACKGROUND

An inflatable bag unit, disposed within a supporting structure such as a panel dash or other fixed portion of a car body in opposing relation to a seat in the vehicle plays an important role in protecting the passengers in a vehicle from injury due to collision against the car body. Typically, the air bag is inflated rapidly by the pressure of a reaction gas released from an inflator during a collision. This gas generation is effected when a gas generating agent in the inflator induces a chemical reaction by a collision signal from a collision detecting sensor when the deceleration of the vehicle exceeds a certain level. The gas which is generated by the inflator is then conveyed to the bag container which expands outwardly as it fills with gas to create a protective barrier between the vehicle occupant and the dash panel or other portion of the vehicle body against which the occupant might otherwise be thrown.

Air bag systems have been used in the past to protect both the operator of the vehicle and passengers. Systems for the protection of the vehicle operator have typically been mounted in the steering column of the vehicle and utilize a bag construction which may be deployed directly towards the driver utilizing the steering column as the base for such deployment. Some drivers-side air bag systems are disclosed in U.S. Pat. No. 3,580,603 to Chute issued May 25, 1971; U.S. Pat. No. 3,618,979 to Gulette issued Nov. 9, 1971; and U.S. Pat. No. 3,752,501 to Daniel, et al. issued Aug. 14, 1973.

Systems for the protection of vehicle passengers have typically been mounted to the dash panel of the vehicle for deployment outwardly directly towards the occupant from a substantially vertical section of the dash panel. In instances where the configuration of the dash panel does not provide a substantially vertical section from which the bag may be deployed directly towards the occupant, such as in the case of a highly sloped dash, air bags have been deployed from the upper surface of the dash panel and have utilized a combination of windshield slope and bag design to direct the inflated bag outwardly from against the windshield glass into a position between the dash panel and the occupant. The use of such non-vertical mounting orientations has, however, generally required the use of bags having complex geometries to cover the dash panel and protect the occupant. Such geometries are typically achieved by means of relatively complex construction practices which include the use of internally disposed straps or tethers to effect the proper expanded configuration. One such bag design is illustrated in the accompanying FIG. 8. As will be appreciated, such complex designs may lead to higher costs due to a limited ability to automate production, while at the same time failing to maximize fabric utilization due to the use of multiple odd-shaped fabric sections. Some prior passenger bag systems are disclosed in U.S. Pat. No. 4,842,300 to Ziomek, et al. issued Jun. 27, 1989; U.S. Pat. No. 5,018,761 to Henseler issued May 28, 1991; U.S. Pat. No. 5,087,071 to Wallnet et al. issued Feb. 11, 1992; and U.S. Pat. No. 5,090,729 to Watanabe issued Feb. 25, 1992.

Systems to deploy an inflatable bag directly towards an occupant from a vertically mounted orientation within the dash panel as well as systems for indirectly deploying (i.e. by means of interaction with the windshield) a complex asymmetrical bag from a non-vertically mounted orientation have thus previously been recognized. The present invention, however, provides a useful system for direct deployment of a simple bag design towards the occupant from a non-vertically mounted orientation, thereby avoiding the need to make use of vertical portions of the dash panel or other support structure.

SUMMARY OF THE INVENTION

In view of the foregoing, it is a general object of the present invention to provide an occupant restraint assembly for use in a vehicle conveying a passenger which can be mounted in a non-vertical orientation and still deploy an inflatable bag directly towards an occupant.

In that respect, it is an object of the present invention to provide an occupant restraint assembly which includes an enclosure rotatably mountable within a dash panel or other support structure.

It is a related object of the present invention to provide an occupant restraint assembly including a generally wedge-shaped enclosure having an open base which is rotatable at least partially out of the dash panel to permit the deployment of an inflatable bag housed therein.

It is a further related object of the present invention to provide an occupant restraint assembly wherein rotation of the inflatable bag enclosure into a deployment position is effected by inflation of the inflatable bag against a guiding member.

Accordingly, it is a feature of the present invention to provide an occupant restraint assembly which can be mounted in a non-vertical orientation within a support structure such as a dash panel, and thereafter be rotated into an activated position for direct deployment of an inflatable bag to form a cushioned barrier between an occupant of a vehicle and the support structure.

It is a subsidiary feature of the present invention to provide an occupant restraint assembly including an enclosure for an inflatable bag wherein the enclosure for the inflatable bag may be rotated at least partially out of a support structure such as a dash panel by the interactive forces between the inflatable bag and an opposing guiding member.

It is yet a further feature of the present invention to provide an occupant restraint assembly including latching means for holding the enclosure in place following rotation out of the support structure.

In accordance with one aspect of the present invention, an occupant restraint assembly for use in a vehicle conveying at least one passenger is provided. The occupant restraint assembly comprises an inflator for generating gas, a bag for receiving and containing the gas generated by the inflator and an enclosure for housing the inflator and the bag. The enclosure is rotatably mountable within a support structure such as the dash panel opposing the passenger, such that during inflation of the bag the enclosure rotates into an activated position for direct deployment of the bag between the support structure and the passenger.

In accordance with a further aspect of the present invention., an occupant restraint assembly is provided wherein the enclosure for an inflator and a bag is rotatable by means of interaction between the bag as it is inflated and a guiding ramp structure disposed in the path of inflation for such bag.

In accordance with yet a further aspect of the present invention, an occupant restraint assembly is provided including and enclosure having a generally wedge-shaped configuration. An inflator is disposed generally at the apex of the enclosure, while an inflatable bag is discharged from the substantially open base. The enclosure is hingedly connected to the support structure near the apex such that the base may be at least partially rotated out of the support structure as the bag contacts and moves along an opposing ramp structure thereby permitting direct deployment of the bag towards a vehicle occupant.

BRIEF DESCRIPTION OF THE DRAWINGS

FIG. 1 shows the completed deployment of an inflatable air bag towards a vehicle occupant from an embodiment of the occupant restraint assembly of the present invention.

FIG. 2 is a top view in partial cross section of the occupant restraint assembly of the present invention.

FIG. 3 is a cut away side view of the occupant restraint assembly of the present invention taken generally along line 3—3 of FIG. 2 prior to inflation.

FIG. 4 is a view generally similar to FIG. 3 but showing the initial stages of inflation.

FIG. 5 is a view taken generally along line 5—5 of FIG. 2 showing the orientation of a potential clamping arrangement for the occupant restraint assembly of the present invention prior to inflation.

FIG. 6 is a view similar to FIG. 5 illustrating the clamping arrangement when the bag is fully deployed.

FIG. 7 shows a prior design for an occupant restraint assembly mounted in a vertical section of a dash panel.

FIG. 8 shows a prior air bag design for use in protecting a vehicle passenger.

While the invention will be described in connection with a preferred embodiment, it will be understood that it is in no way intended to limit the invention to that embodiment. On the contrary, it is intended to cover all alternatives, modifications and equivalents as may be included within the true spirit and scope of the invention as defined by the appended claims.

DESCRIPTION

Turning now to the drawings, in FIG. 1 there is shown a vehicle 10 for use in transporting at least one passenger 12 supported by a seat 14. Further illustrated in FIG. 1 is an occupant restraint assembly 20 which includes a rotatable enclosure 22 which encloses an inflator 24 and an inflatable bag 26 illustrated in full deployment between the passenger 12 and the dash panel 28 of the vehicle 10. In the illustrated and preferred embodiment, the occupant restraint assembly 20 also preferably includes a ramp structure 30 disposed in opposing relation to the rotatable enclosure 22 to effect rotation thereof as described more fully below.

As illustrated in FIG. 1, The dash panel 28 serves as a support structure for the occupant restraint assembly 20 of the present invention. It is to be understood that alterative support structures may likewise be utilized as dictated by the environment of use for the occupant restraint assembly 20. By way of example only, if the occupant restraint assembly is to be used to protect a passenger in a rearward seat (not shown) of a vehicle 10, the forward seat 14 may be used as the support structure.

A top view in partial cross section of an embodiment of the occupant restraint assembly 20 of the present invention is shown in FIG. 2, while FIGS. 3 and 4 illustrate the initial stages of deployment of the inflatable bag 26. As illustrated by combined reference to FIGS. 1-4, the occupant restraint assembly 20 of the present invention is mountable directly beneath a non-vertical portion of the dash panel 28. As will be recognized, many dash panels incorporate substantial unused non-vertical portions. By contrast, vertical space is typically rather limited, being taken up by operating instruments and other components such as glove boxes and the like.

As illustrated by FIG. 7, placement of prior restraint assemblies in a substantially vertical portion of the dash panel 28a directly opposing a passenger has been used to permit the direct deployment of an inflatable bag 26a towards a passenger. As will be appreciated by those of skill in the art, such direct deployment is advantageous in that it may permit the use of relatively simply configured bag designs.

By direct deployment is meant deployment outwardly directly towards the passenger to be protected without the need for interaction between the windshield and the inflatable bag to achieve coverage of the dash panel by the inflatable member. Heretofore, such direct deployment has not been utilized by occupant restraint assemblies mounted in non-vertical portions of the dash panel, rather, as indicated previously, the practice has been to make use of indirect deployment utilizing a relatively complicated inflatable bag 26b including internal straps or tethers 27b, 29b (FIG. 8) which may be deployed up from and around a dash panel. The present invention makes use of the available non-vertical space on a dash panel 28 or other support structure while at the same time obtaining the benefits of direct deployment wherein a relatively simply shaped inflatable bag 26 may be utilized.

In the illustrated embodiment, the rotatable enclosure 22 is of a substantially wedge-shaped configuration including a proximal apex 34, and a distal base 36 (FIG. 6). As illustrated, the distal base 36 is substantially open to permit the deployment of the inflatable bag 26 therefrom. The interior of the rotatable enclosure is defined by a plurality of wall members. Specifically, the illustrated embodiment incorporates an upper wall member 37, a lower wall member 38 and two side wall members 39, 40. It is to be understood, however, that any number of other wall configurations as may occur to one of skill in the art may likewise be utilized.

As shown, the rotatable enclosure 22 is preferably mounted beneath the surface of the dash panel 28 by a hinge connection 45 preferably disposed near the proximal apex 34 of the rotatable enclosure 22, although alternative placement of the hinge connection 45 closer to the distal base 36 may also be utilized. As will be appreciated by those of skill in the art, once the rotatable enclosure 22 is mounted within the dash panel 28, the installation may be covered over by appropriate flexible materials to present the appearance of continuity across the surface thereof.

As illustrated through reference to FIGS. 3, 4 and 6, the hinge connection 45 permits rotation of the distal base 36 of the rotatable enclosure 22 at least partially out of the dash panel 28 or other support structure. The movement of the rotatable enclosure 22 out of the dash panel 28 is preferably initiated and carried out through the expansion of the inflatable bag 26. Specifically, when the inflator 24 is activated, the gas which is generated flows into the inflatable bag 26, thereby causing it to expand and to apply force against the opposing ramp structure 30 mounted within the dash panel 28. As will be readily appreciated, any force applied against the ramp structure 30 results in a force of equal magnitude but opposite direction applied against the inflatable bag 26. By virtue of these forces, the inflatable bag will tend to move along the ramp structure 30 which serves as a guide and will eventually break out of confinement from beneath the cover on the surface of the dash panel 28. The cover for the rotatable enclosure 22 will preferably include a notch 47 extending across the surface or some other suitable break-away construction as is well known in the art to permit the exit of the rotatable enclosure 22 in a predetermined manner. While the interaction of the ramp structure 30 and the inflatable bag 26 may represent a preferred means to effect rotation of the rotatable enclosure 22 it is to be understood that alternative means such as a power cylinder or motors and the like as are known to those of skill in the art may likewise be utilized.

Once the distal base 36 of the rotatable enclosure 22 begins to rotate out of the dash panel 28, the inflatable bag 26 may be directly deployed outwardly towards the passenger 12 (FIG. 1). As indicated previously, such direct deployment permits the use of relatively simple bag designs while still providing an effective barrier between the passenger 12 and the dash panel 28. One potential bag design is illustrated in FIGS. 1 and 6, and would comprise a face portion 50, a rear body portion 52 and a neck portion 54. It is contemplated that no internal tethers or other shape-modifying components would be necessary, thereby potentially enhancing the efficiency of production.

Once the inflatable bag 26 is deployed, it may be desirable to prevent the rotatable enclosure 22 from rotating back into the dash panel 28. In the illustrated and preferred embodiment, such rotation is prevented by means of engageable latch assemblies 60 disposed outboard of the side walls 39, 40 of the rotatable enclosure 22 as seen most clearly in FIGS. 2 and 6. The latch assemblies 60 are illustrated as including a mateable dog 62 and hasp 64, although it is to be understood that alternative latching assemblies as are known to those of skill in the art may likewise be utilized.

In accordance with the above description, it is seen that the present invention provides an occupant restraint assembly which may be mountable in a non-vertical portion of a dash panel or other support structure while permitting direct deployment of an inflatable bag towards a passenger to be protected.

What is claimed is:

1. An occupant restraint assembly for use in a vehicle conveying a passenger, the occupant restraint assembly comprising:
   an inflator for generating gas;
   a bag for receiving and containing the gas generated by said inflator such that said bag may be inflated; and
   a hingedly mounted rotatable container for enclosing and supporting said inflator and said bag, said hingedly mounted rotatable container being mounted in a support structure opposing said passenger such that during inflation of said bag said hingedly mounted rotatable container rotates at least partially out of said support structure into an activated position during deployment of said bag between said passenger and said support structure.

2. The occupant restraint assembly of claim 1, further comprising a guiding ramp disposed in opposing relation to said bag within said support structure, such that inflation of said bag causes said bag to contact and move along said guiding ramp to exit said support structure.

3. The occupant restraint assembly of claim 1, wherein said support structure comprises a dash panel disposed in front of said passenger.

4. An occupant restraint assembly mounted in a dash panel opposing a passenger on the front seat of a motor vehicle, comprising:
   an inflator for generating an inflating medium;
   an inflatable airbag for receiving the inflating medium generated by said inflator;
   a wedge-shaped rotatable container for enclosing and supporting said inflator and said inflatable airbag, said wedge-shaped rotatable container including an apex and an open base to permit the exit of said inflatable airbag as it is inflated;
   a hinge disposed adjacent to said apex of said wedge-shaped rotatable container; and
   a ramp disposed in opposing relation to said base of said rotatable container, such that during inflation of said inflatable airbag, said inflatable airbag will contact and move along said ramp thereby rotating said rotatable container at least partially out of said dash panel about said hinge as said airbag exits said rotatable container during deployment between said dash panel and said passenger.

5. The occupant restraint assembly of claim 4, further comprising a latch assembly for holding said rotatable container in place, after said rotatable container is rotated out of said dash panel.

* * * * *